United States Patent … Wall et al.

(10) Patent No.: US 12,533,952 B2
(45) Date of Patent: Jan. 27, 2026

(54) TRIM ASSEMBLY FOR A REAR SIDE OF A FLEXIBLE DISPLAY UNIT WHICH CAN BE MOVED BETWEEN A RETRACTED AND AN EXTENDED STATE AND DISPLAY DEVICE HAVING THE DISPLAY UNIT AND THE TRIM ASSEMBLY, AND MOTOR VEHICLE

(71) Applicant: AUDI AG, Ingolstadt (DE)

(72) Inventors: Christian Wall, Hitzhofen (DE); Johannes Herold, Dresden (DE); Jens Schirmer, Dresden (DE)

(73) Assignee: AUDI AG, Ingolstadt (DE)

( * ) Notice: Subject to any disclaimer, the term of this patent is extended or adjusted under 35 U.S.C. 154(b) by 4 days.

(21) Appl. No.: 18/580,858

(22) PCT Filed: Jul. 8, 2022

(86) PCT No.: PCT/EP2022/069115
§ 371 (c)(1),
(2) Date: Jan. 19, 2024

(87) PCT Pub. No.: WO2023/001595
PCT Pub. Date: Jan. 26, 2023

(65) Prior Publication Data
US 2024/0326593 A1 Oct. 3, 2024

(30) Foreign Application Priority Data
Jul. 19, 2021 (DE) ............... 10 2021 118 526.2

(51) Int. Cl.
*G06F 1/16* (2006.01)
*B60K 35/22* (2024.01)
(Continued)

(52) U.S. Cl.
CPC .......... *B60K 35/223* (2024.01); *B60K 35/53* (2024.01); *B60K 35/55* (2024.01); *B60K 37/20* (2024.01)

(58) Field of Classification Search
CPC ...... B60K 35/223; B60K 35/53; B60K 35/22; B60K 35/55; B60K 37/20; G06F 3/147; G09G 2380/02
See application file for complete search history.

(56) References Cited

U.S. PATENT DOCUMENTS

2013/0135839 A1* 5/2013 Sawada ............... H04M 1/0237
 361/810
2017/0371371 A1* 12/2017 Liu ...................... G06F 1/1626
(Continued)

FOREIGN PATENT DOCUMENTS

CN 107545849 B 3/2021
DE 10 2015 011 614 A1 3/2017
(Continued)

OTHER PUBLICATIONS

International Search Report issued in International Application No. PCT/EP2022/069115 dated Nov. 11, 2022.
(Continued)

*Primary Examiner* — Howard D Brown, Jr.
(74) *Attorney, Agent, or Firm* — STAAS & HALSEY LLP

(57) ABSTRACT

In an example, a lining arrangement for a back side of a flexible display unit which can be moved between a retracted and an extended state, may include at least two lining parts which are arranged adjustably between the retracted state and the extended state in accordance with the telescopic principle. The at least two rigid lining parts may be in form of at least two rigid lining panels which are arranged in plane-parallel fashion, with each rigid lining panel of the at least two rigid lining panels held together in
(Continued)

pairs by an internal bearing arrangement that has guide elements arranged in cutouts in each rigid lining panel of the at least two rigid lining panels, and in this respect are mounted displaceably relative to one another along a displacement path in the plane-parallel fashion.

16 Claims, 6 Drawing Sheets

(51) Int. Cl.
*B60K 35/53* (2024.01)
*B60K 35/55* (2024.01)
*B60K 37/20* (2024.01)

(56) References Cited

U.S. PATENT DOCUMENTS

| | | |
|---|---|---|
| 2019/0232884 A1 | 8/2019 | Yamada et al. |
| 2020/0264660 A1 | 8/2020 | Song et al. |
| 2023/0254986 A1* | 8/2023 | Wall .................... H05K 5/0217 361/807 |

FOREIGN PATENT DOCUMENTS

| | | | | |
|---|---|---|---|---|
| DE | 10 2017 214 737 A1 | 2/2019 | | |
| EP | 1 637 387 A1 | 3/2006 | | |
| EP | 1 659 032 A1 | 5/2006 | | |
| EP | 1 498 304 B1 | 1/2010 | | |
| EP | 3273322 A1 * | 1/2018 | ............. | G09F 9/301 |
| EP | 3 531 232 A | 8/2019 | | |
| EP | 3 915 959 A1 | 12/2021 | | |
| WO | WO 2014/178126 A1 | 11/2014 | | |

OTHER PUBLICATIONS

Written Opinion issued in International Application No. PCT/EP2022/069115 dated Nov. 11, 2022.
German Office Action issued in counterpart German Application No. 10 2021 118 526.2 dated Apr. 27, 2022.
German Office Action issued in counterpart German Application No. 10 2021 118 526.2 dated Jul. 23, 2024.
English Translation of IPRP (PCT/IB/338 and PCT/IB/373) (Feb. 1, 2024 and Jan. 18, 2024) and the Written Opinion of ISA (PCT/ISA/237) issued in counterpart International Application No. PCT/EP2022/069115 on Nov. 11, 2022 (13 pages).
PCT/IB/326 issued in counterpart International Application No. PCT/EP2022/069115 dated Feb. 1, 2024.

* cited by examiner

TRIM ASSEMBLY FOR A REAR SIDE OF A FLEXIBLE DISPLAY UNIT WHICH CAN BE MOVED BETWEEN A RETRACTED AND AN EXTENDED STATE AND DISPLAY DEVICE HAVING THE DISPLAY UNIT AND THE TRIM ASSEMBLY, AND MOTOR VEHICLE

CROSS-REFERENCE TO RELATED APPLICATIONS

This application is a U.S. national stage of International Application No. PCT/EP2022/069115, filed on Jul. 8, 2022, which claims the priority benefit of German Patent Application No. 10 2021 118 526.2 filed on Jul. 19, 2021. Both the International Application and the German Patent Application are incorporated by reference herein in their entirety.

BACKGROUND

1. Field

The examples of the invention may relate to a display device which comprises a movable display unit with a flexible screen film. A rolling mechanism is provided for alternately rolling up and unrolling at least one part of the display unit. The examples may also relate to a lining arrangement for a back side of the movable display unit. The examples may moreover relate to a motor vehicle having the display device.

2. Description of the Related Art

A display device and a lining arrangement of the stated type are known from EP 3 531 232 A1. The lining arrangement described in that document has rigid lining parts which are arranged adjustably between a collapsed state and an extended state in accordance with the telescopic principle. In order to keep the lining parts together, an external rail system arranged on the edges of the lining parts is provided. This makes the lining arrangement undesirably bulky from a visual perspective.

In modern motor vehicles, one or more displays can be used to present information for drivers and front-seat passengers. Depending on the driving situation, a display size of varying magnitude is frequently necessary in this respect. This situation has already been dealt with for quite some time by retracting and extending the display. While recently, in modern motor vehicles, use has been made of increasingly large displays which as a result become increasingly central elements of the cockpit configuration, the problem thus increasingly arises of concealing such large displays inside the vehicle console when not in use.

To this end, screen films that can be rolled up are known, as are described for example in US 2020/02646660 A1 in connection with a smartphone.

DE 10 2017 214 737 A1 discloses two screens for a motor vehicle which can be slid telescopically one into the other and for which a screen film can be used.

Current developments in the field of flexible display panels (screen films) increasingly allow a trend toward thinner displays (overall thickness measured perpendicularly in relation to the display surface), in order to present information in a timely fashion. The greater the ratio of the display height in the extended state to the display height in the retracted state is selected to be (what is referred to as multiplication factor), the greater the challenges of producing thin displays are, however, in terms of the selection of the guide concept and complying with desires.

SUMMARY

In an example, a back lining may be provided for an extendable display unit that can be made particularly thin (as measured perpendicularly in relation to the display surface of the display unit) and still contributes to the mechanical stability.

The examples described may be the subject matter of the independent patent claims. Advantageous developments of the will emerge from the dependent patent claims, the following description and the figures.

In an example, a lining arrangement may be provided for a back side of a flexible display unit which can be moved between a retracted and an extended state. The lining arrangement may have at least two lining parts which are arranged adjustably or movably between a collapsed state and an extended state (in accordance with the telescopic principle). It is possible to provide two or three or four lining parts, for example.

In order to be able to make the lining arrangement thin or flat, in an example, the lining parts may be respectively in the form of rigid lining panels which are arranged in a plane-parallel fashion, are respectively held together in pairs by an internal bearing device or bearing system, wherein in this respect the rigid lining panels of course are mounted displaceably relative to one another along a displacement path for the telescopic collapsing and extending operations) in the plane-parallel fashion. For the internal arrangement of the bearing system, the bearing system has guide elements that are arranged in cutouts in the lining panels. In other words, a stack of lining panels is provided as lining arrangement. A "lining panel" is understood to mean in particular a component which extends predominantly in a panel plane. The lining panels are arranged plane-parallel to one another, that is their panel planes are aligned parallel to one another. The stack of lining panels can be fanned out or extended along the displacement path, with the result that the lining panels are arranged offset in relation to one another. In the collapsed state, the lining panels may be in line with one another one on top of another, that is to say in particular top edges of the lining panels may be in line with one another. The a respective lining panel of the lining panels may for example be provided on the basis of a plastic or a metal.

In order to conceal the guide elements of the bearing device for a viewer looking from the outside, guide elements may be arranged in cutouts, for example grooves or depressions, in the surfaces of a respective lining panel of the lining panels, with the result that the guide elements are covered or enclosed by the lining panels at least in the collapsed state. The lining panel which is at the front with respect to the display unit represents a contact surface for supporting and/or fastening the display unit. It can therefore, for example, take up an operating force acting, on the lining panel at the front, perpendicularly in relation to the display surface and transmit this force via the guide elements to the next lining panel, that is to say in particular the underlying lining panel in the slid-out or extended state. This transmission of force is continued until the lining panel facing away from the display unit discharges or transmits the force to a housing of a display device to which the lining arrangement can be fastened.

In the extended state, the lining plate that is at the front with respect to the display unit may also represent the uppermost or top lining panel in the intended installation position, and the lining panel that faces away from the display unit represents the lowest or bottom lining panel.

An aspect of an example results in the advantage that, in the collapsed state, the lining arrangement outwardly represents a visually simply configurable panel stack of two or more than two lining panels, that is to say the guide elements of the internal bearing device in the collapsed state of the lining panels are not visible from the outside, but rather are covered by the lining panels or arranged between them. Since the guide elements are arranged in cutouts in the lining panels, the lining panels can also lie one on top of another or be arranged at a spacing from one another with a gap width of at most 0.5 millimeters, with the result that lining panels can be provided as a stack with a thickness of for example 3 to 8 millimeters and with a spacing or a gap width of less than 0.5 millimeters. This has the effect of a visually flat structure which only needs to be less than three times as thick as the flexible display unit itself. Consequently, the lining arrangement does not have a disruptive or dominating effect from a visual perspective.

An aspect of an example also comprises developments that result in additional advantages.

In an example, in the internal bearing system or bearing device, a respective one of the lining panels held together in pairs has a groove which extends along the displacement path with a rod arranged therein and the other one of the lining panels held together in pairs has a linear bearing engaging around the rod. The externally not visible guide elements thus engage in one another or around one another in the region between the lining panels in that a rod of one lining panel is engaged around or enclosed by a linear bearing of the other lining panel.

In an example, the linear bearing is in the form of a hollow cylinder which has a cylinder height that is at least three times the diameter of the rod. The hollow cylinder can slide on said rod along the displacement path, as a result of which the lining panel holding the hollow cylinder is displaced along the displacement path relative to the lining panel holding the rod. Since the hollow cylinder has the described length or cylinder height in this case, it is also still possible in the extended state, when the two lining panels have a maximum lateral offset in relation to one another, to transfer a sufficient bending moment as can be exerted by the operating force (for example in a range of 2 newtons to 10 newtons) on the uppermost lining panel in the event of a manual operating procedure.

In an example, the hollow cylinder has an internal ball bearing, by which the hollow cylinder rolls on the engaged-around rod. Since the hollow cylinder does not slide on the rod in the form of a sliding bearing, but rather a ball bearing with multiple balls is provided in the hollow cylinder, the inner side of the hollow cylinder rolls on the rod. This can be effected noiselessly, with the result that no additional noise is generated by the lining arrangement while an extension width or extension height of the display unit is being moved or adjusted. In the event of two guide elements of which the rods are arranged parallel, the jamming or wedging or tilting of the two lining panels may be avoided.

In an example, the lining panels may be held together exclusively by their guide elements and/or an imaginary separating plane arranged between the lining panels is interrupted exclusively by the guide elements. In other words, the lining panels are in the form of planar panels. According to the described examples, none of the lining panels have an extension with which a lining panel would engage around another lining panel from the outside, as can be the case in the prior art. Therefore, according to the described examples, the result is no extensions of bent or curved or kinked form on the lining panels, as a result of which the production of an unnecessary structure depth or thickness of the lining arrangement is avoided.

In an example, more than two lining parts are provided and therefore at least one lining panel has front cutouts and back cutouts for respective guide elements, wherein, for at least one of these lining panels, the front cutouts on the one hand and the back cutouts on the other hand are arranged next to one another and thus offset in relation to one another in a panel plane of the lining panel. If three or more than three lining panels are provided, then at least one lining panel is located between two further lining panels, with the result that both a front side of this lining panel and the back side of this lining panel are each connected to another lining panel via respectively one or two or more than two guide elements. In order to be able to provide the cutouts for the front guide elements and the cutouts for the back guide elements, the cutouts may be arranged offset next to one another, that is in the panel plane, with the result that the thickness of the lining panel can be smaller than the sum of the depths of the two cutouts that are arranged next to one another.

In an example, more than two lining parts are provided and therefore at least one lining panel has front cutouts and back cutouts for respective guide elements, wherein, for at least one of these lining panels, the front cutouts on the one hand and the back cutouts on the other hand are arranged in line one behind another in a panel plane of the lining panel. This example has proven to be particularly stable and/or rigid and/or stiff with respect to the transmission of a bending moment from the top lining panel to the bottom lining panel, which can be connected to a housing of a display device, in the extended state.

In an example, the lining panels have a bevel on oppositely situated lateral edges, the bevels forming a beveled side face, and in the collapsed state of the lining arrangement the beveled side faces of the lining panels are arranged flush with one another and as a result represent a common oblique side wall of the lining arrangement, which results in the formation of a shape of the lining arrangement that tapers toward a back side of the lining arrangement. In the installed state, the lining panels may stand vertically upright. The result is therefore a right-hand and a left-hand lateral edge on each lining panel. Here, the lining panels may be configured with a beveled or chamfered side face, that is to say the respective surface of the side face is arranged at an acute angle with respect to the panel plane. In this case, the lining panels get smaller in successive steps proceeding from the display unit, with the result that the beveled side faces form a wedge-shaped tapered portion or V-shaped tapering shape of the lining arrangement in the collapsed state of the lining arrangement. The side faces of the lateral edges are aligned flush with one another in this respect. This results in the advantage that, from a perspective obliquely from the front of the display unit with the lining arrangement arranged behind it, the observer gets a visually narrow impression, since the rear or back edge of the lining arrangement, that is to say the edge of that lining panel that faces away from the display unit, is not visible.

In an example, the lining panel that represents a back side of the lining arrangement facing away from the display unit has a fastening device for fastening to a housing of a display device, and this lining panel has a stepped thickness profile which tapers in at least one step toward the side edges of the lining panel. The lowermost or last lining panel in the stack of lining panels does not need to have a cutout for a subsequent lining panel, which is why it can have a tapered or smaller thickness profile than the rest of the lining panels. This can be utilized to give a visually slimmer impression of the lining arrangement when it is looked at from the side.

In an example, a display device for displaying pixel-based display content may include a display unit having a flexible screen film for displaying the display content and having an at least partially flexible screen carrier, against which a back side of the screen film rests, and a rolling mechanism for rolling up at least one part of the display unit in a housing of the display device for a retracted or drawn-in state and for extending it out of the housing for an extended or drawn-out state, wherein the rolling up and extending operations of course take place alternately.

The display device may include a lining arrangement for a back side of the display unit facing away from the display unit that is provided on the housing, the lining arrangement is an example of the display device, and a back lining panel of the lining arrangement is arranged fixedly on the housing and a lining panel of the lining arrangement that is at the front with respect to the display unit is connected to the display unit. Flexible screen films are known per se from the prior art and can for example be provided based on OLED technology (Organic Light Emitting Diode). Such a screen film can be arranged on a screen carrier, for example a flexible mat or a flexible honeycomb structure, in order to carry the screen film and/or support it with respect to the described operating force, which can act perpendicularly on the display surface of the operating film. The screen film and the screen carrier that carries the screen film and/or supports the screen film result in the display unit, which can be at least partially retracted by being rolled up in a housing of the display device and can be extended by unrolling it out of the housing. In the housing, that part of the display unit that is rolled up therein can be rolled up on a roll body, for example a cylinder, or rolled up in the form of a hollow roll or hollow cylinder. It is not necessary to roll it up completely by 360 degrees; it is also possible for example to coil it or roll it up to form three-quarters of a cylinder or half a cylinder or one quarter of a cylinder, to name only examples. That portion of the display unit that still protrudes or projects in the extended state and preferably also in the retracted state can be lined by the described lining arrangement toward a back side of the display. In the extended state, the lining arrangement, together with the extended part of the display unit, can extend upwardly by virtue of the telescopic extension or displacement of the lining panels. Therefore, the display unit remains completely lined or covered on its back side by the lining arrangement even in the extended or slid-out state, when the lining panel that faces toward the display unit is connected to the display unit.

As a further example, a motor vehicle may having the display device according to the described examples. In the motor vehicle, the display device may be arranged for example in an operating console (that is to say a dashboard). The lining panels may stand upright or vertically. The rolling up of the part of the display unit can be performed inside the operating console. To extend the display unit, the operating console may have a slot or a gap, through which the display unit can be extended into an interior space of the motor vehicle. The motor vehicle may in the form of a motor car, in particular a passenger car or truck, or in the form of a minibus or motorcycle.

The examples of the invention also comprise the combinations of the features of the described examples. The described examples thus also comprises implementations which include a respective combination of the features of several of the described examples, unless the examples have been described as being mutually exclusive.

BRIEF DESCRIPTION OF DRAWINGS

Examples of the invention are described below. In the figures.

DESCRIPTION

The examples explained below are examples of the invention. In the examples, the described components each may represent individual features that should be considered independently of one another and that each also develop the examples independently of one another. The disclosure is therefore also intended to comprise combinations of the features of the examples other than those illustrated. In addition, the described examples can also be complemented by further features of the examples that have already been described.

In the figures, the same reference signs denote elements that have the same function.

Figure 1:
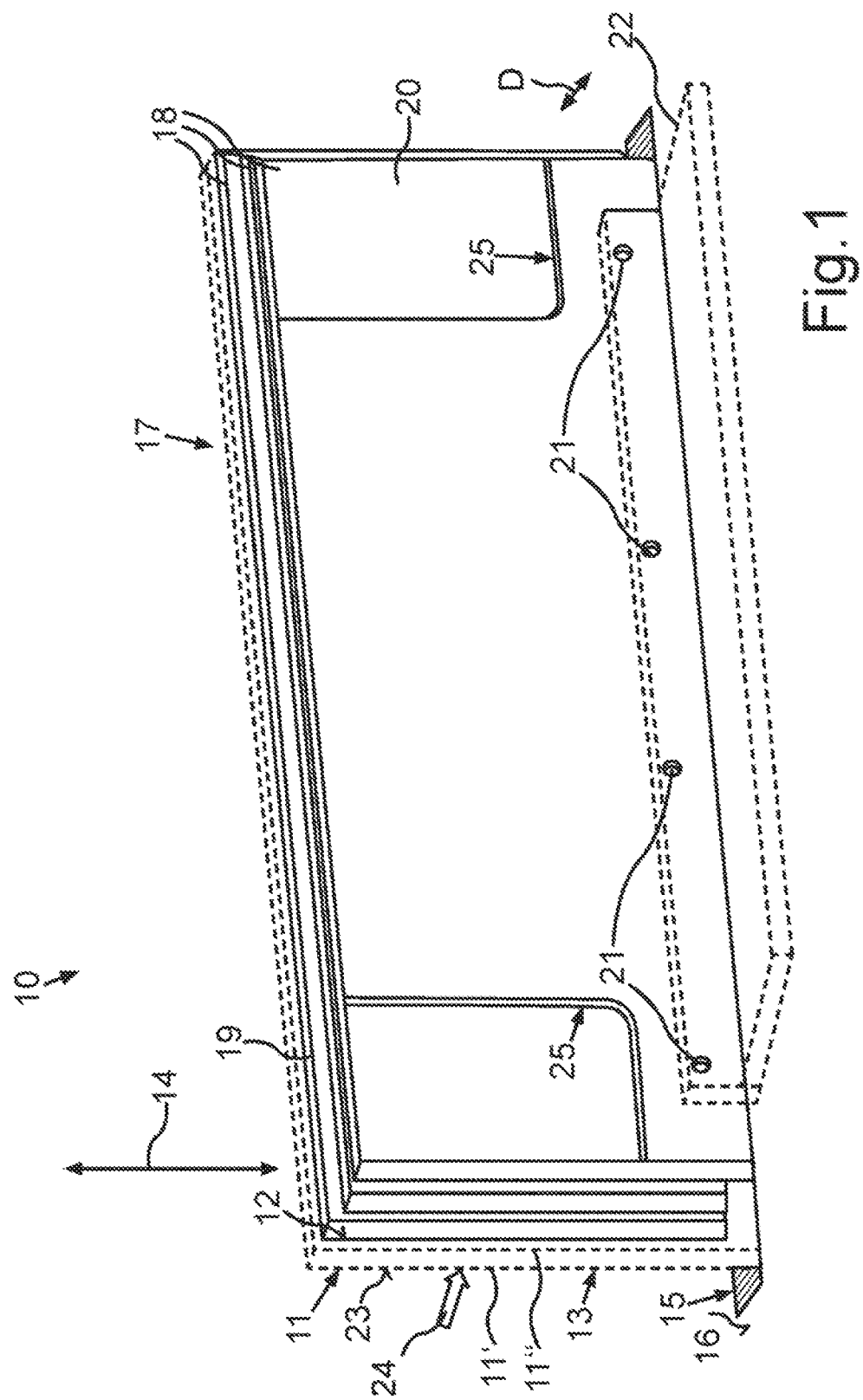
FIG. 1 shows a schematic illustration of a perspective view of a back side of a lining arrangement in a display device according to an example in the retracted state.

FIG. 1 shows a lining arrangement 10 as can be arranged on the back side 12 of a display unit 11, in order to line or to protect or to cover the display unit 11 toward its back side 12. The display unit 11 can be a constituent part of a display device 13 which can retract and extend the display unit 11 from a slot or gap 15 in a housing 16 along a displacement path 14. The retracted or drawn-in state of the display unit 11 is illustrated.

Figure 4:
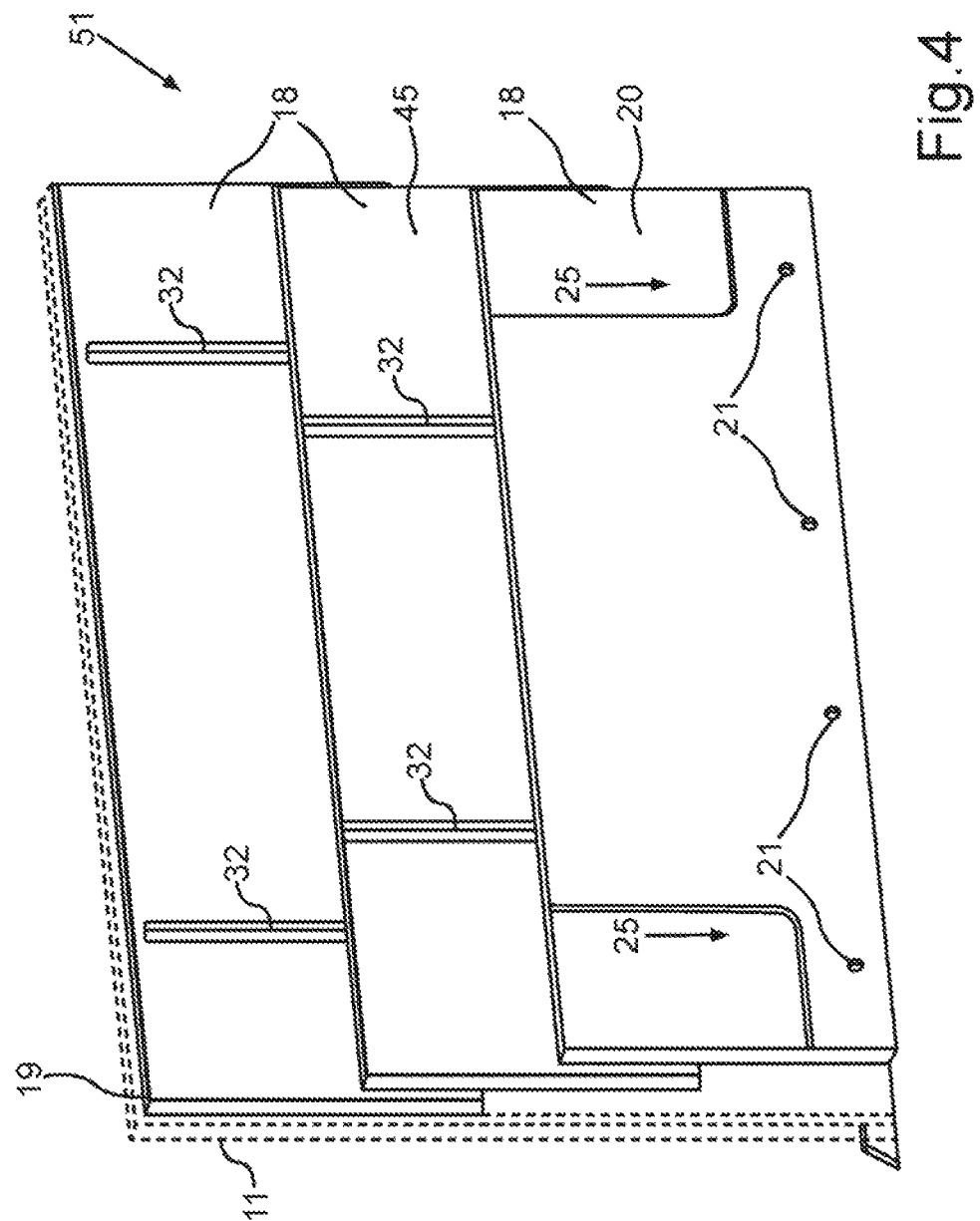
FIG. 4 shows a schematic illustration of a perspective view of the back side of the lining arrangement of FIG. 1 in the extended or drawn-out state.

In order that the back side 12 is also protected or covered or lined by the lining arrangement 10 in all retracted and extended states when the display unit 11 is being displaced or moved along the displacement path 14, the lining arrangement 10 can likewise have a collapsed state 17, as illustrated in FIG. 1, and an extended state 51 (illustrated in FIG. 4).

The lining arrangement 10 can have multiple lining panels 18 which are arranged parallel to one another to form a stack, as illustrated in FIG. 1. In other words, the lining panels 18 are arranged coplanarly with one another or parallel to one another. The display unit 11 may be fastened to a lining panel 19 facing toward the display unit 11. A lining panel 20 of the lining arrangement 10 that faces away from the display unit 11 can represent a back side of the lining arrangement 10 and can be fixedly connected to the housing 16 by a fastening device 21. For example, for this a mounting piece 22, for example, an angled metal sheet, may be provided, with this being only by way of example. As a result of the fixed connection to the housing 16, via the back lining panel 20 an operating force 24, which acts on a display surface 23 of the display unit 11 and can act perpendicularly on the display surface 23, can be discharged through the lining arrangement 10 via the front lining panel 19 and to the housing 16 via the back lining panel 20 and the fastening device 21. What is illustrated is that the back lining panel 20 can have a stepped vertical profile or thickness profile 25, as a result of which an overall thickness D of the lining arrangement 10 as measured perpendicularly in relation to the display surface 23 can be kept small from a visual perspective. The fastening device 21 may for example comprise screw holes or bores.

Figure 2:
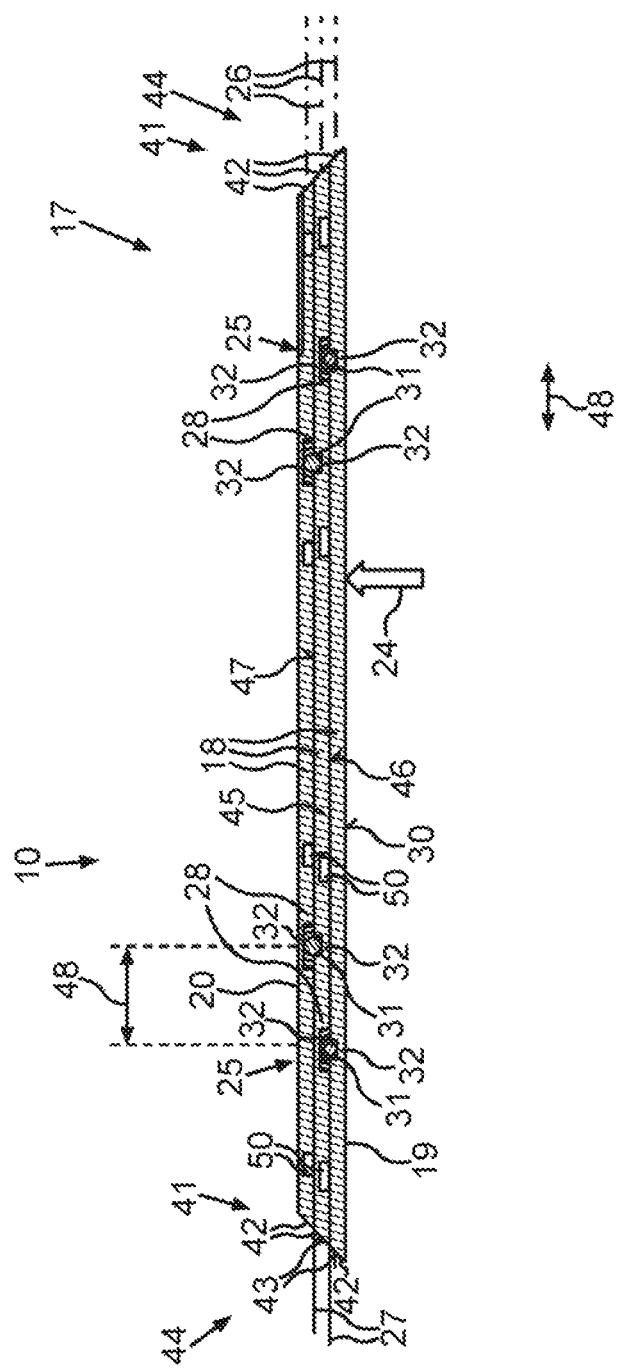
FIG. 2 shows a schematic illustration of a section of the lining arrangement of FIG. 1.

FIG. 2 shows a plan view of a section through the lining arrangement 10. What is illustrated is how the lining panels 18 are stacked and, in this respect, how panel planes 26 of the lining panels 18 are arranged parallel to one another. An imaginary plane 27, which is not interrupted by the lining panels 18 themselves, may extend between the lining panels 18. The lining panels 18 may be connected to one another by an internal bearing system 28. The front lining panel 19 may have a contact surface 30, against which the display unit 11 can rest in order to take up or transmit the operating force 24 or to support the display unit 11 with respect to the operating force 24.

The internal bearing system 28 can have guide elements 31 which can each be arranged in a depression or cutout 32 in the panel form or rectangular form of the respective lining panel 18, so that the lining panels 18 can rest against one another or on one another with a small gap width and a small spacing of less than half a millimeter.

Figure 3:
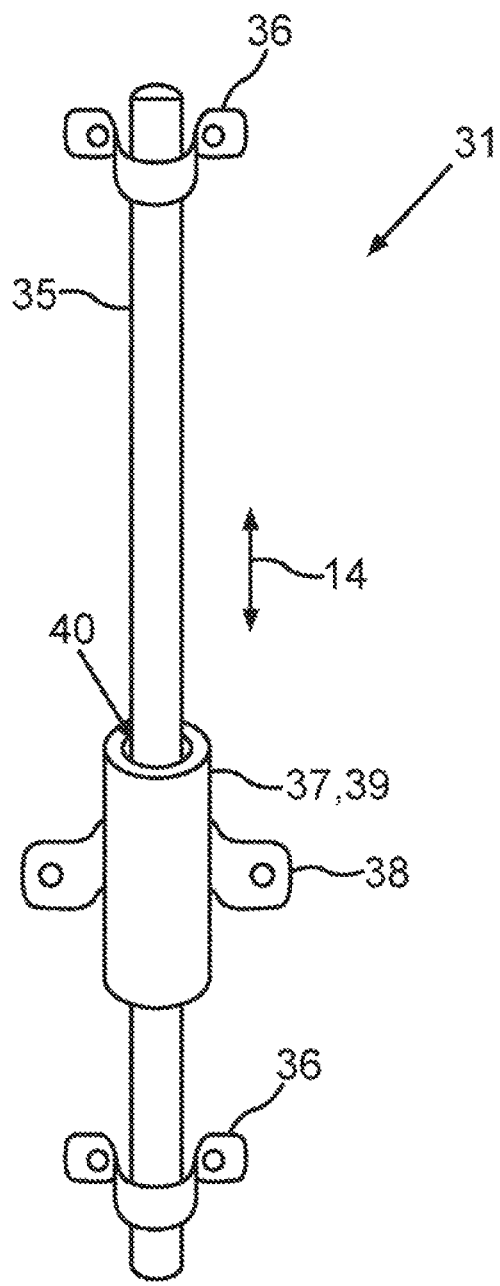
FIG. 3 shows a schematic illustration of a perspective view of a linear bearing as can be used in the lining arrangement of FIG. 2.

FIG. 3 illustrates a guide element 31 by way of example. The guide element 31 makes it possible to hold together two respective adjacent lining panels 18 (not illustrated) in pairs and at the same time still mount them in particular linearly displaceably with respect to one another along the displacement path 14. On one of the lining panels 18, a rod 35 can be arranged in the oppositely situated cutouts 32 in the plate pair of the lining panels 18 and, as illustrated by way of example in FIG. 3, for example retained by brackets 36. The other lining panel may hold a linear bearing 37, which by way of example can be fastened to this other lining panel likewise by a bracket 38. The linear bearing 37 may for example be realized by a hollow cylinder 39, which can engage around the rod 35 of the other lining panel 18. A ball bearing 40 may be provided in the hollow cylinder 39 in order that an inner side of the hollow cylinder 39 can roll on the rod 35. The rod 35 can for example be made from steel.

FIG. 2 also illustrates how respective sides 41 of the lining panels 18 may have a bevel 42, as a result of which the respective side face 43 is aligned at an acute angle to the panel plane 26 (illustrated at the top in FIG. 2). In this case, the side faces 43 are arranged in line with one another in the collapsed state 17, with the result that an oblique side wall 44 of the lining arrangement 10 is produced as a whole.

FIG. 2 illustrates that more than two, in the example there are three, lining plates 18 can be provided, with the result that a lining panel 45 can have both front cutouts 32 on a front side 46 and back cutouts on a back side 47. Within the panel plane 26, these cutouts may have a lateral offset 48, with the result that the front cutouts on the one hand and the back cutouts on the other hand are arranged next to one another and thus offset in relation to one another in the panel plane 26 of the lining panel 45. What is illustrated is how additional cutouts 50 can be provided in order to be able to likewise arrange for example wiring and/or support rails inside the lining arrangement 10.

FIG. 4 depicts the already mentioned extended state 51 of the lining arrangement 10 as is produced when the front lining panel 19 is raised by for example the display unit 11 when the latter is being extended. The respective next lining panel, here the lining panel 45, is raised via the internal bearing system 28 when the end of travel of the respective guide element is reached. In this respect, FIG. 4 shows the back side, that is the side facing away from the display unit 11.

The display unit 11 can have a screen film 11', which can be carried or supported by a flexible screen carrier 11". Also illustrated is how the internal cutouts 32 can be visible in the extended or drawn-out state 51.

Figure 5:
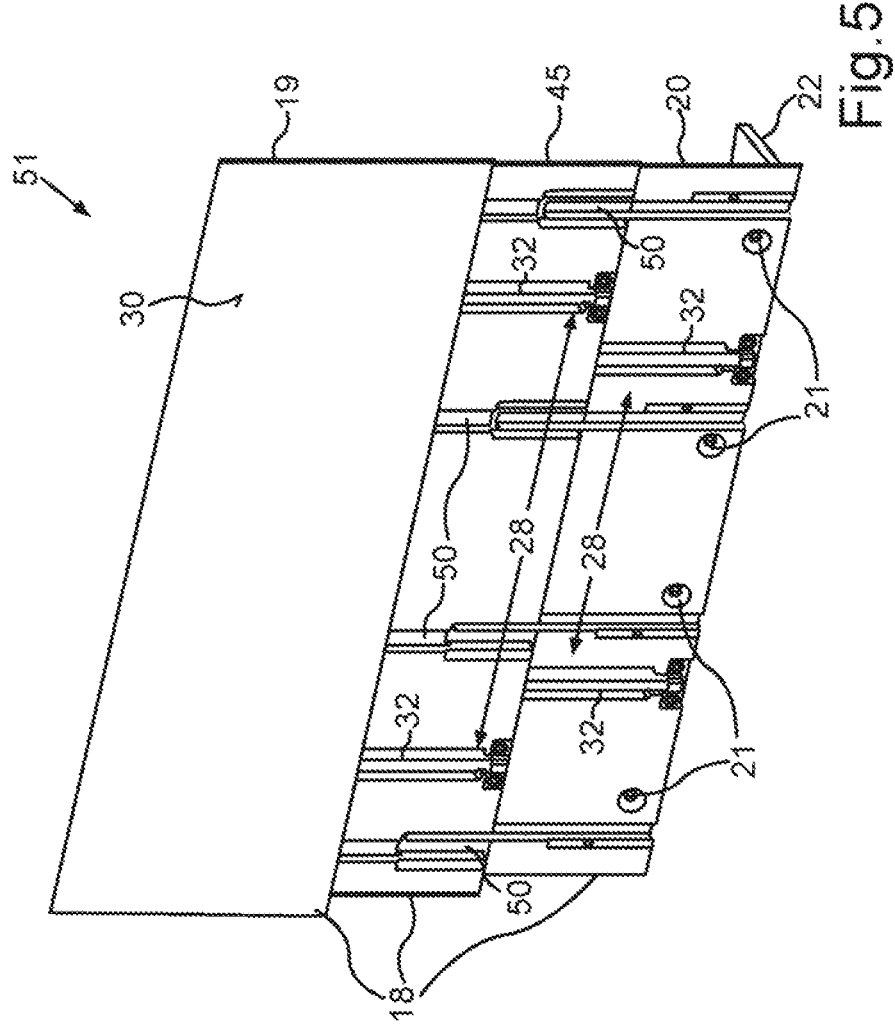
FIG. 5 shows a schematic illustration of a perspective view of a front side of the lining arrangement in the extended or drawn-out state.

FIG. 5 shows the extended state 51 from the front side. This part or this view is externally covered by the display unit 11 for an observer in the installed state. What can be seen is how the internal bearing system 28 therefore also remains covered or concealed for the observer in the event of the extended state 51.

FIG. 5 shows a front view also of internal components in cavities provided for them (covering front panel of the display unit is hidden in this illustration).

Figure 6:
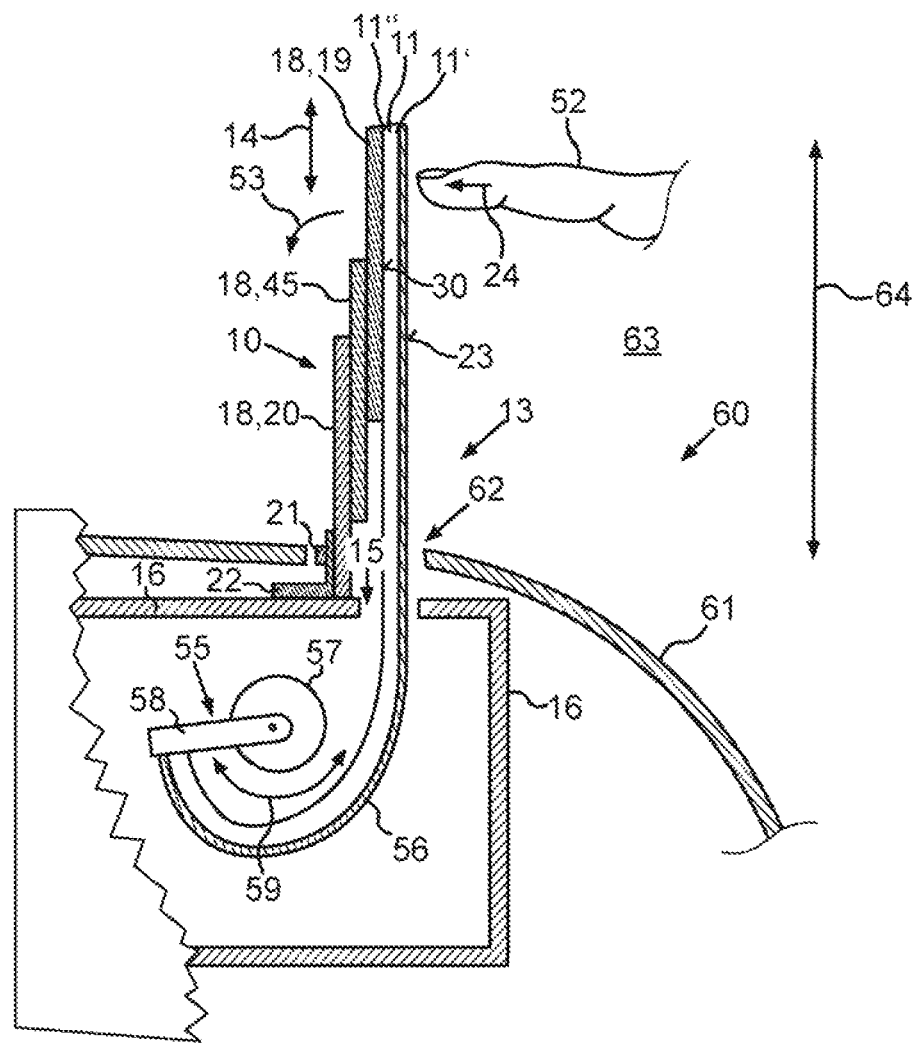
FIG. 6 shows a schematic illustration of a side view of the display device in the extended state, as can be provided in a motor vehicle according to an example.

FIG. 6 depicts a side view of how a user can exert the operating force 24 on the display unit 11 with the screen film 11' and the screen carrier 11" by their fingers 52, for example when an operating surface that can be displayed on the display surface 23 is tapped on. Owing to the operation by the operating force 24, a bending moment 53 can be produced in the lining arrangement 10. The lining arrangement 10 can be installed in the described display device 13, which in its housing 16 can roll up or roll in at least part of the display unit 11 by a rolling mechanism 55 providing a rolling-up operation, to form a roll shape 56. To this end, for example, a rotary motor 57 of the rolling mechanism 55 can perform a pivoting movement or rotary movement 59 by a pivot arm 58 of the rolling mechanism 55 and as a result wind up or unwind the roll shape 56, with the result that the movement of the display unit along the displacement path 14 in the region of the lining arrangement 10 is produced. The display device 13 can for example be installed in a motor vehicle 60, of which an operating console 61 is illustrated in FIG. 6, which can have a gap 62 which may be arranged in line with the gap 15 of the housing 16 so that the display unit 11 and the lining arrangement 10 can project through the gap 62 into an interior space 63 of the motor vehicle 60. A portion 64, which is variable owing to the displacement or movement of the display unit 11, can thus be displayed or presented or made available to the user by the display surface 23 in the interior space 63.

Consequently, for the lining panels, this results in a guide concept with a high magnification factor, which overcomes a conflict of interest with the requirements for stiffness and robustness of the display (display device) in uses ranging from touch operation (with the operating force 24) through faulty operation (by a child; use as a boarding or disembarking aid) to withstanding high accelerations in accident situations.

The result is still a thin display of the portion projecting into the vehicle interior space 63.

Guide elements in a nested arrangement are used. In principle, multi-step guides can be provided next to one another (in the display surface direction; see FIG. 3) and also one behind another (in the display depth direction). The first-mentioned variant offers the advantage of a minimum thickness but has limited robustness. The latter-mentioned variant behaves inversely to this.

The outwardly visible lining panels 18 are hollowed out at certain points (cutouts 32), as a result of which they provide space inside them for guide elements 31, while at the same time a virtually uninterrupted surface is visible from the outside (see FIG. 1 and FIG. 4).

The described guide concept for the lining panels 18 exhibits the two-step design with laterally offset guide elements. Furthermore, greater magnification factors are conceivable with a multi-step arrangement.

In this respect, the force and moment loading of the individual guide steps or lining panels decreases upwardly owing to greater lever lengths and the mass of steps lying thereabove. Owing to a gradation of the dimensions of the individual guide elements (for example thinner rods 35), a robust design together with optimization of material outlay and weight may be obtained (cf. in this respect the different dimensions of the guide elements 31 in FIG. 3).

Owing to the option of combining closed and thereby visually appealing surfaces with any desired arrangements, each optimized in terms of the requirements in force, of parallel guide steps, the guide concept shown here represents an extremely flexible method for the design of slim and still robust linear guides.

Overall, the examples show how a two-step guide with outwardly not visible guide elements can be provided.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in Superguide v. DIRECTV, 358 F3d 870, 69 USPQ2d 1865 (Fed. Cir. 2004).

The invention claimed is:

1. A lining arrangement for a back side of a flexible display unit which is moveable between a retracted state and an extended state, the lining arrangement comprising:
   at least two lining parts which are adjustable between the retracted state and the extended state along a displacement path of the at least two lining parts, the at least two lining parts including at least two rigid lining panels which are arranged in a plane-parallel fashion, and respectively held together in pairs by an internal bearing system which includes guide elements arranged in grooves in respective surfaces of each rigid lining panel of the at least two rigid lining panels, so that the at least two rigid lining panels are mounted to one another and displaceable relative to one another along the displacement path in the plane-parallel fashion.

2. The lining arrangement as claimed in claim 1, wherein the grooves extend along the displacement path, and the guide elements include a rod in a groove of a first rigid lining panel of a pair of rigid lining panels of the at least two rigid lining panels held together, and a linear bearing in a groove of a second rigid lining panel of the pair of rigid lining panels which is engaged around the rod to form an engaged-around rod.

3. The lining arrangement as claimed in claim 2, wherein the linear bearing includes a hollow cylinder which has a cylinder height that is at least three times a diameter of the rod.

4. The lining arrangement as claimed in claim 3, wherein the hollow cylinder has an internal ball bearing, so that the hollow cylinder rolls on the engaged-around rod.

5. The lining arrangement as claimed in claim 1, wherein the at least two rigid lining panels are held together by the guide elements and/or an imaginary separating plane arranged between the at least two rigid lining panels is interrupted exclusively by the guide elements.

6. The lining arrangement as claimed in claim 1, wherein the at least two rigid lining panels include more than two rigid lining panels, and at least one rigid lining panel of the at least two rigid lining panels has front grooves and back grooves for each guide element of the guide elements, wherein,
   for the at least one rigid lining panel, the front grooves and the back grooves are arranged next to one another and offset in relation to one another in a panel plane of the at least one rigid lining panel, and/or
   for the at least one rigid lining panel, the front grooves and the back grooves are arranged in line one behind another in a panel plane of the at least one rigid lining panel.

7. The lining arrangement as claimed in claim 1, wherein the at least two rigid lining panels have respective bevels on oppositely situated lateral edges of the at least two rigid lining panels, the respective bevels forming respective beveled side faces, and in the retracted state of the lining arrangement, the respective beveled side faces of the at least two rigid lining panels are arranged flush with one another so that the respective beveled side faces represent a respective common oblique side wall of the lining arrangement, resulting in formation of a shape of the lining arrangement that tapers toward a back side of the lining arrangement.

8. The lining arrangement as claimed in claim 1, wherein a rigid lining panel of the at least two rigid lining panels that represents a back side of the lining arrangement facing away from the flexible display unit has a fastening device to be fastened to a housing of a display device, and the rigid lining panel has a stepped thickness profile which tapers in at least one step towards respective lateral side edges of the rigid lining panel.

9. A display device to display a pixel-based display content, comprising:
   a display unit having a flexible screen film to display the pixel-based display content and having an at least partially flexible screen carrier, against which a back side of a screen film rests;
   a rolling mechanism to alternately roll up at least one part of the display unit in a housing of the display device for a retracted state and extending at least one part of the display unit out of the housing for an extended state; and
   a lining arrangement for a back side of the display unit facing away from the display unit is provided on the housing, the lining arrangement configured to include at least two lining parts which are adjustable between the retracted state and the extended state along a displacement path,
   the at least two lining parts including at least two rigid lining panels which are arranged in a plane-parallel fashion and respectively held together in pairs by an internal bearing system including guide elements arranged in grooves in respective surfaces of each rigid lining panel of the at least two rigid lining panels, so that the at least two rigid lining panels are mounted to one another and displaceable relative to one another along the displacement path in the plane-parallel fashion, and
   a back rigid lining panel of the at least two rigid lining panels that represents a back side of the lining arrangement facing away from the display unit is arranged fixedly on the housing and a front rigid lining panel of the at least two rigid lining panels that represents front side of the lining arrangement facing towards the display unit is connected to the display unit.

10. The display device as claimed in claim 9, wherein the grooves extend along the displacement path, and the guide elements include a rod in a groove of a first rigid lining panel of a pair of rigid lining panels of he at least two rigid lining panels held together, and a linear bearing in a groove of a second rigid lining panel of the pair of rigid lining panels which is engaged around the rod to form an engaged-around rod.

11. The display device as claimed in claim 10, wherein the linear bearing includes a hollow cylinder which has a cylinder height that is at least three times a diameter of the rod.

12. The display device as claimed in claim 11, wherein the hollow cylinder has an internal ball bearing, so that the hollow cylinder rolls on the engaged-around rod.

13. A motor vehicle, comprising:
- a display unit having a flexible screen film to display content and having an at least partially flexible screen carrier, against which a back side of a screen film rests;
- a rolling mechanism to alternately roll up at least one part of the display unit in a housing of a display device for a retracted state and extending at least one part of the display unit out of the housing for an extended state; and
- a lining arrangement for a back side of the display unit facing away from the display unit is provided on the housing, the lining arrangement configured to include at least two lining parts which are adjustable between the retracted state and the extended state along a displacement path,
- the at least two lining parts including at least two rigid lining panels which are arranged in a plane-parallel fashion and respectively held together in pairs by an internal bearing system including guide elements arranged in grooves in respective surfaces of each rigid lining panel of the at least two rigid lining panels, so that the at least two rigid lining panels are mounted to one another and displaceable relative to one another along the displacement path in the plane-parallel fashion, and
- a back rigid lining panel of the at least two rigid lining panels that represents a back side of the lining arrangement facing away from the display unit is arranged fixedly on the housing and a front rigid lining panel of the at least two rigid lining panels that represents front side of the lining arrangement facing towards the display unit is connected to the display unit.

14. The motor vehicle as claimed in claim 13, wherein the grooves extend along the displacement path, and the guide elements include a rod in a groove of a first rigid lining panel of a pair of rigid lining panels of the at least two rigid lining panels held together, and a linear bearing in a groove of a second rigid lining panel of the pair of rigid lining panels which is engaged around the rod to form an engaged-around rod.

15. The motor vehicle as claimed in claim 14, wherein the linear bearing includes a hollow cylinder which has a cylinder height that is at least three times a diameter of the rod.

16. The motor vehicle as claimed in claim 15, wherein the hollow cylinder has an internal ball bearing, so that the hollow cylinder rolls on the engaged-around rod.

\* \* \* \* \*